No. 891,301. PATENTED JUNE 23, 1908.
G. SPREEN.
ARTIFICIAL TREE.
APPLICATION FILED FEB. 27, 1908.
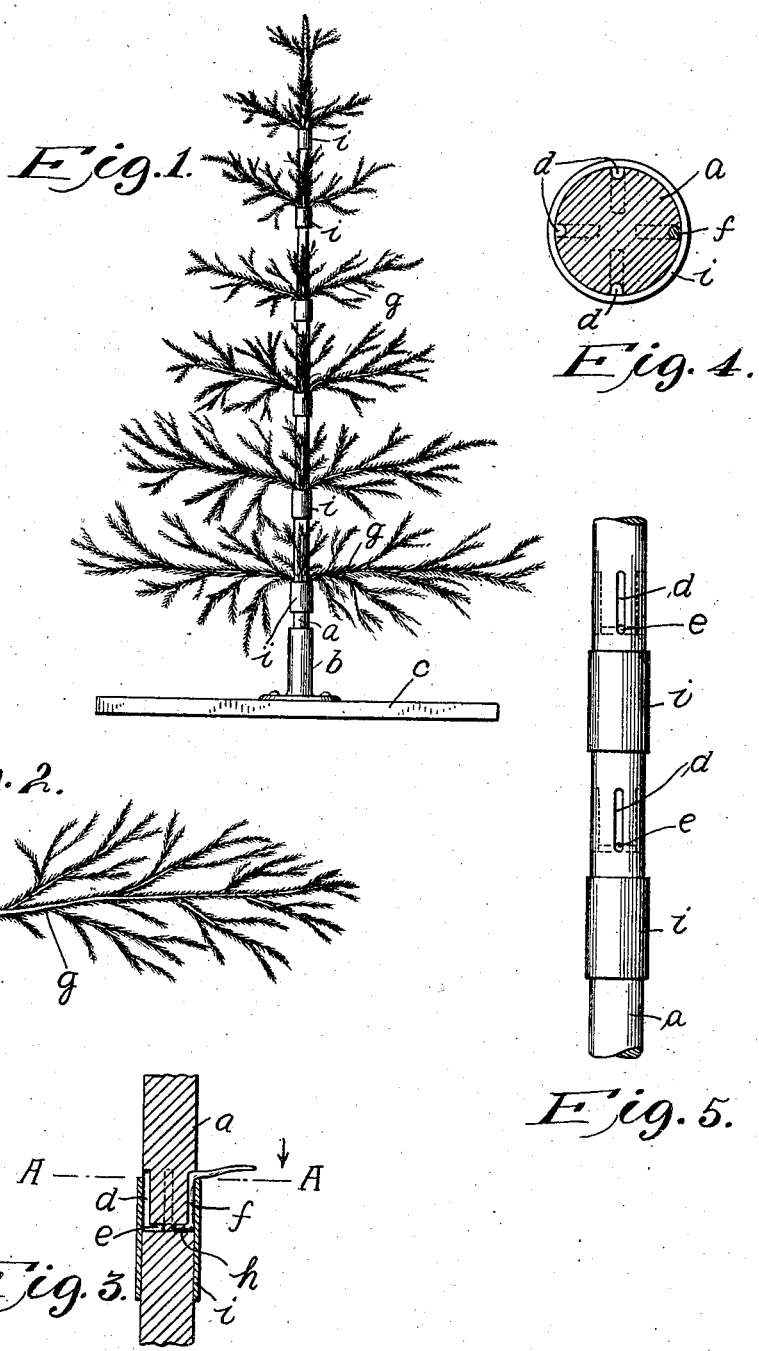

UNITED STATES PATENT OFFICE.

GUSTAV SPREEN, OF MEDFORD, WISCONSIN.

ARTIFICIAL TREE.

No. 891,301.  Specification of Letters Patent.  Patented June 23, 1908.

Application filed February 27, 1908. Serial No. 418,003.

*To all whom it may concern:*

Be it known that I, GUSTAV SPREEN, a citizen of the United States, residing at Medford, in the county of Taylor and State of Wisconsin, have invented certain new and useful Improvements in Artificial Trees, of which the following is a specification, reference being had to the accompanying drawings.

My invention relates to improvements in artificial trees; and an object of my invention is to provide an artificial tree which will be simple in construction, cheap in manufacture and readily assembled and taken apart.

In the drawings illustrating the principle of my invention and the best mode now known to me of applying that principle, Figure 1 is an elevation showing my new artificial tree assembled; Fig. 2 is a detail showing one of the limbs; Fig. 3 is a sectional detail showing the manner in which a limb is fastened to the tree-post; Fig. 4 is a section on line A—A of Fig. 3 and Fig. 5 is a detail of the post showing the sleeves removed from over the grooves.

The tree-post $a$ is held in a socket-member $b$ which may be bolted or otherwise suitably secured to the floor $c$. At intervals along its length the tree-post $a$ is formed with longitudinal grooves $d$ in the bottom wall of which is made a hole $e$ of much greater depth than the groove $d$. The base portion $f$ of each limb or bough $g$ is bent at right angles to the main part of the bough and is formed with a stem $h$ which extends nearly parallel with the general direction of the bough. The stem $h$ is inserted in the hole $e$ in the tree-post, while the base-portion $f$ of the limb is fitted in the groove $d$. The limb is then fastened in place by sliding up the sleeve $i$ over the base $f$.

It will be seen that the tree consists of few parts and may readily be assembled and taken apart. Further, the parts of the tree are susceptible of being compactly arranged for transportation or storage, when the tree is dismantled. Again, a large number of grooves may be made in the tree-post, whereby a large variety of arrangement of the limbs is made possible. The sleeves $i$ cover the grooves $d$ and give to the assembled tree a sightly appearance,—an important feature in imitation trees for use on gala days.

I claim:

1. An artificial tree consisting of a tree-post formed with a series of longitudinal grooves; limbs each having a base part bent at an angle to the main part of the limb and adapted to fit in the said grooves; and a sleeve slidably mounted on said tree-post and adapted to be slipped over the base parts of said limbs, whereby the latter are locked in said grooves.

2. An artificial tree consisting of a tree-post formed with a series of longitudinal grooves the bottom wall of each of which is formed with a hole; limbs each having a base part bent at an angle to the main part of the limb and formed with a stem at its end, said base part being adapted to fit in said grooves and said stem being adapted to fit in said holes in the bottom of said grooves; and a sleeve slidably mounted on said tree-post and adapted to be slipped over the base parts of said limbs fitted in said grooves, whereby the limbs are held detachably in place on the tree-post.

In witness whereof I have hereunto set my hand at Marshfield, Wis., this 21st day of February, A. D. 1908, in the presence of the two undersigned witnesses.

GUSTAV SPREEN.

Witnesses:
EDWIN J. HAHN,
M. ELSEN.